United States Patent [19]
Chang

[11] Patent Number: 6,021,688
[45] Date of Patent: Feb. 8, 2000

[54] TWIST HANDLEBAR FOR CONTROLLING THE DERAILLEUR OF A BICYLE

[76] Inventor: Wen-Pin Chang, P.O. Box 55-175, Taichung, Taiwan

[21] Appl. No.: 09/160,258

[22] Filed: Sep. 25, 1998

[51] Int. Cl.[7] ............................ B62K 23/04; B62M 25/04
[52] U.S. Cl. ......................... 74/502.2; 74/489; 74/473.28
[58] Field of Search ................................... 74/527, 502.2, 74/489, 473.14, 473.28

[56] References Cited

U.S. PATENT DOCUMENTS

| | | | |
|---|---|---|---|
| 5,524,501 | 6/1996 | Patterson et al. | 74/527 X |
| 5,615,580 | 4/1997 | Chen et al. | 74/502.2 X |
| 5,666,859 | 9/1997 | Arbeiter et al. | 74/527 X |
| 5,676,020 | 10/1997 | Jordan et al. | 74/473.14 |

Primary Examiner—Mary Ann Battista

[57] ABSTRACT

The handlebar includes a base seat connected to a headset of the bicycle having a circular housing for receiving a displacement device and a tubular projection. The displacement device is composed of a tension ring rotatably engaged onto the tubular projection and has a retaining space for anchoring the large diameter end of a cable and an L-shaped slit for securing a spring plate, an arcuate plate anchored into a pair of slit abutting the side wall of the housing having a plurality of positioning slots engageable with an arcuate end of the spring plate. A handlebar rotatably coupling with the base seat including a pair of actuator plates for respectively actuating the tension ring and the spring plate to obtain the shifting of the spring plate on the positioning slots to adjust the speed for the derailleur.

5 Claims, 8 Drawing Sheets

TWIST HANDLEBAR FOR CONTROLLING THE DERAILLEUR OF A BICYLE

BACKGROUND OF THE INVENTION

The present invention relates to the handlebar of bicycle and more particularly to a twist handlebar which is rotatably to adjust the tensions of the deraileur and precisely controls the speeds of the bicycle by a stable displacement of a positioning device in the handlebar.

Figure 1:
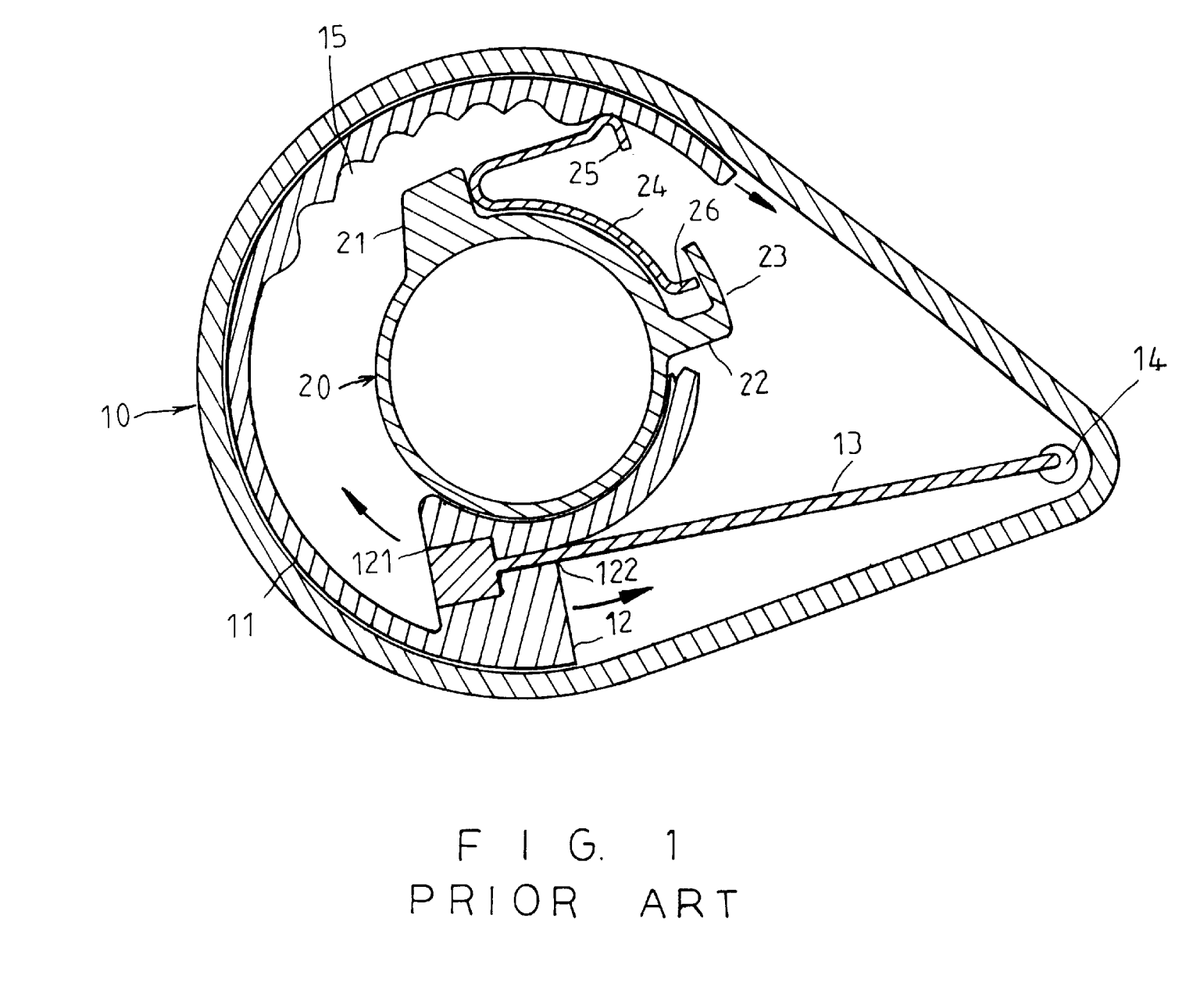
FIGS. 1 and 2 are the sectional views to show a twist handlebar of the prior art.
Figure 2:
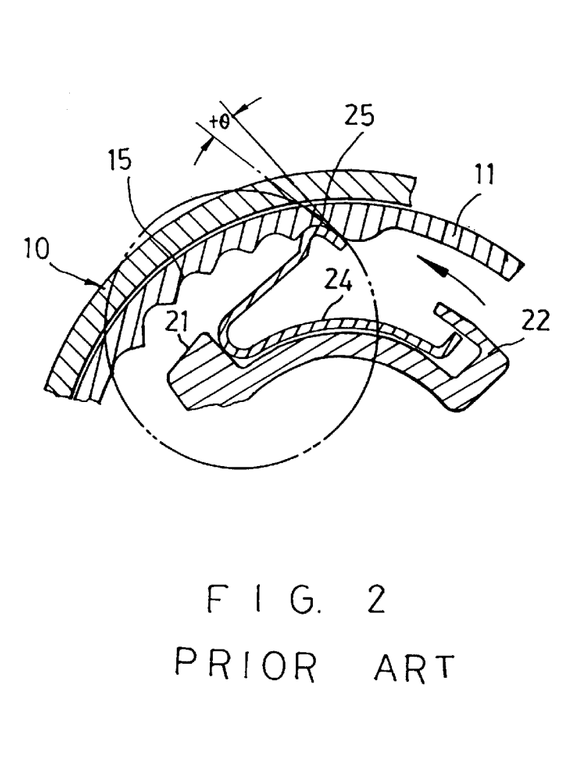

A stable controlling system provides a precise operation of the derailleur of a bicycle, thus an optimum design of a handlebar for a bicycle equiped with derailleurs is very important. A typical twist handlebar of bicycle as shown in FIGS. 1 and 2 comprises a housing 10 of a rotatable handle including an arcuate retaining plate 11 which has a slot 121 abutting a bore 122 in an inward extension 12 for gripping a large diameter end of a cable 13 which has another end extending out of the housing 10 via a thru hole 14 and connected to a derailleur of a bicycle, and a plurality of positioning slots 15 continuously formed in an inner periphery opposite to the extension 12, a stationary ring 20 fixedly secured to a base of the handlebar and including a first and second projections 21 and 22 for securing a roughly U-shaped spring plate 24 which has an inverse first end 25 displaceably engaging with the positioning slots 15 and a transverse extension 23 laterally extended from the second projection 22 so as to define a receiving space therein for disposing a bent second end 26 of the spring plate 24. When the handlebar twists clockwise or counterclockwise, the retaining plate 11 moves in concert with the handlebar and its positioning the first end 25 of the spring plate 24 under friction so that the tension of the derailleur through the cable 13 are variable.

However, the structure of this handlebar is designed under the concept of friction which is substantially an unstable design. Because the structure stability of this handlebar is effected by the resilience of the spring in the derailleur, therefore, if the first end 25 of the spring plate 24 is displaced to a rightmost positioning slot 15 (as shown in FIG. 1), the structure becomes unstable because of that the resilience of the spring becomes greater. If method is made to improve the stability by increasing the friction between the spring plate 24 and the slot 15, it requires greater returning torque when the spring plate 24 engages with leftmost positioning slot 15 and this handlebar will become more difficult to operate for it relies upon skillfully manual operation. Further, the first end 25 of the spring plate 24 has a bevel outer surface (as shown in FIG. 2) which has a tangent line defines a positive angle (+θ) relative to the tangent line of the inner surface of the positioning slots 15. This proves that the bevel surface facilitates a ready displacement but sacrifies a positional stability between the first end 25 and the slots 15.

SUMMARY OF THE INVENTION

The present invention has a main object to provide a twist handlebar for controlling the derailleur of a bicycle which includes a more stable structure to reliably control the displacement of a spring plate with the positioning slots for precisely change the speed of the derailleur.

Another object of the present invention is to provide a twist handlebar for controlling the derailleur of a bicycle which comprises a less parts in comparison with a twist handlebar of a prior art, and the parts which are under optimum design can be readily assembled so as to reduce the cost to manufacture.

Still another object of the present invention is to provide a twist handlebar for controlling the derailleur of a bicycle in which the parts can provide precisely operational function but tolerate greater allowable error.

Further object of the present invention is to provide a twist handlebar for controlling the derailleur of a bicycle which is durable because it is operated under less friction.

Accordingly, the twist handlebar of the present invention comprises generally a base seat connected to the headset of a bicycle, a displacement device disposed into the base seat and including a tension ring for securing the large diameter head of the cable, a spring plate and a positioning plate. A handlebar rotatably coupled with the base seat and including a first and second actuator plates for respectively actuating the tension ring to tense the cable and actuating the spring plate to displace the tension plate in the positioning slots.

The present invention will become more fully understood by reference to the following detailed description thereof when read in conjunction with the attached drawings.

DETAILED DESCRIPTION OF THE PREFERRED EMBODIMENT

Figure 3:
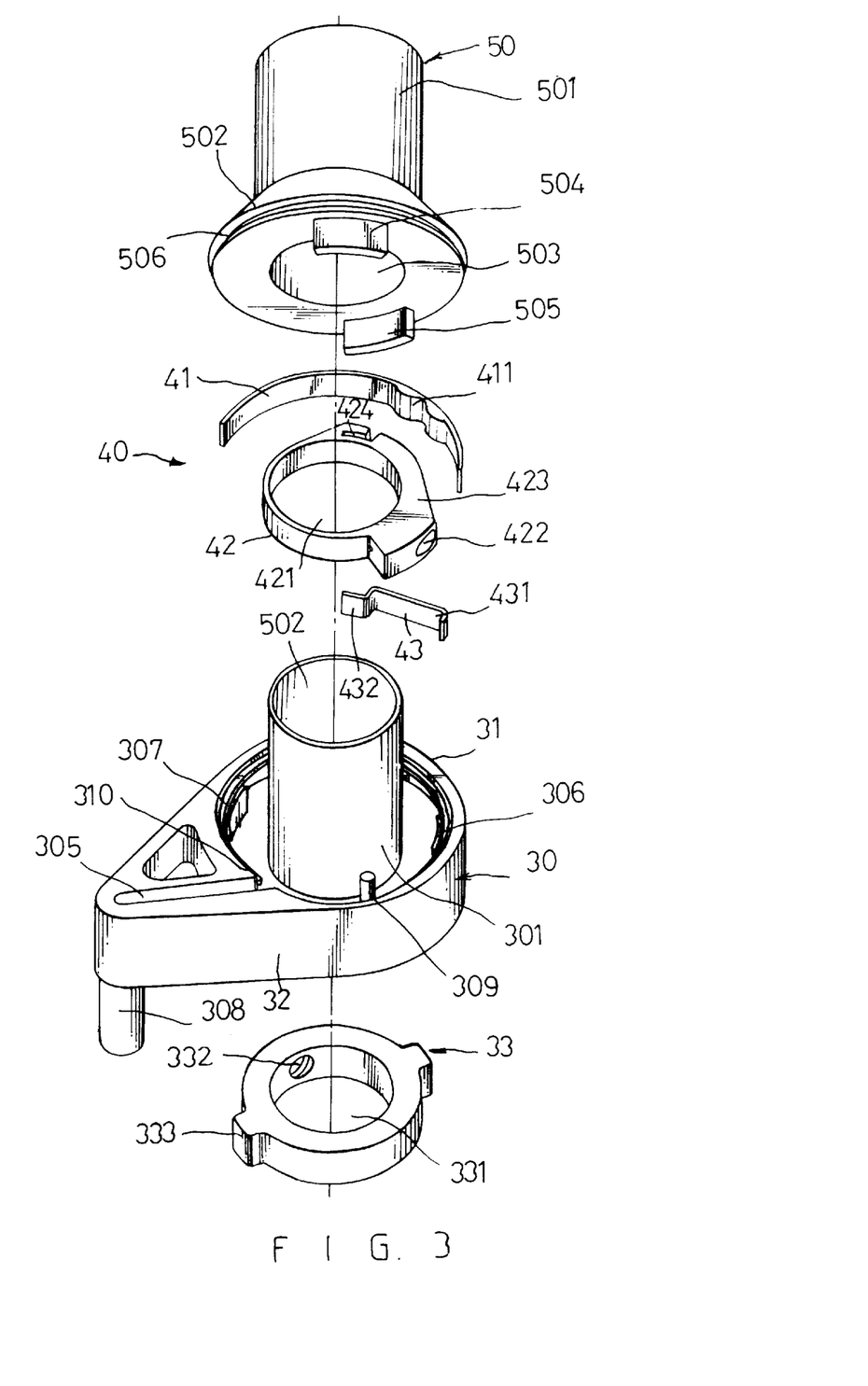
FIG. 3 is an exploded perspective view to show a preferred embodiment of the present invention.
Figure 4:
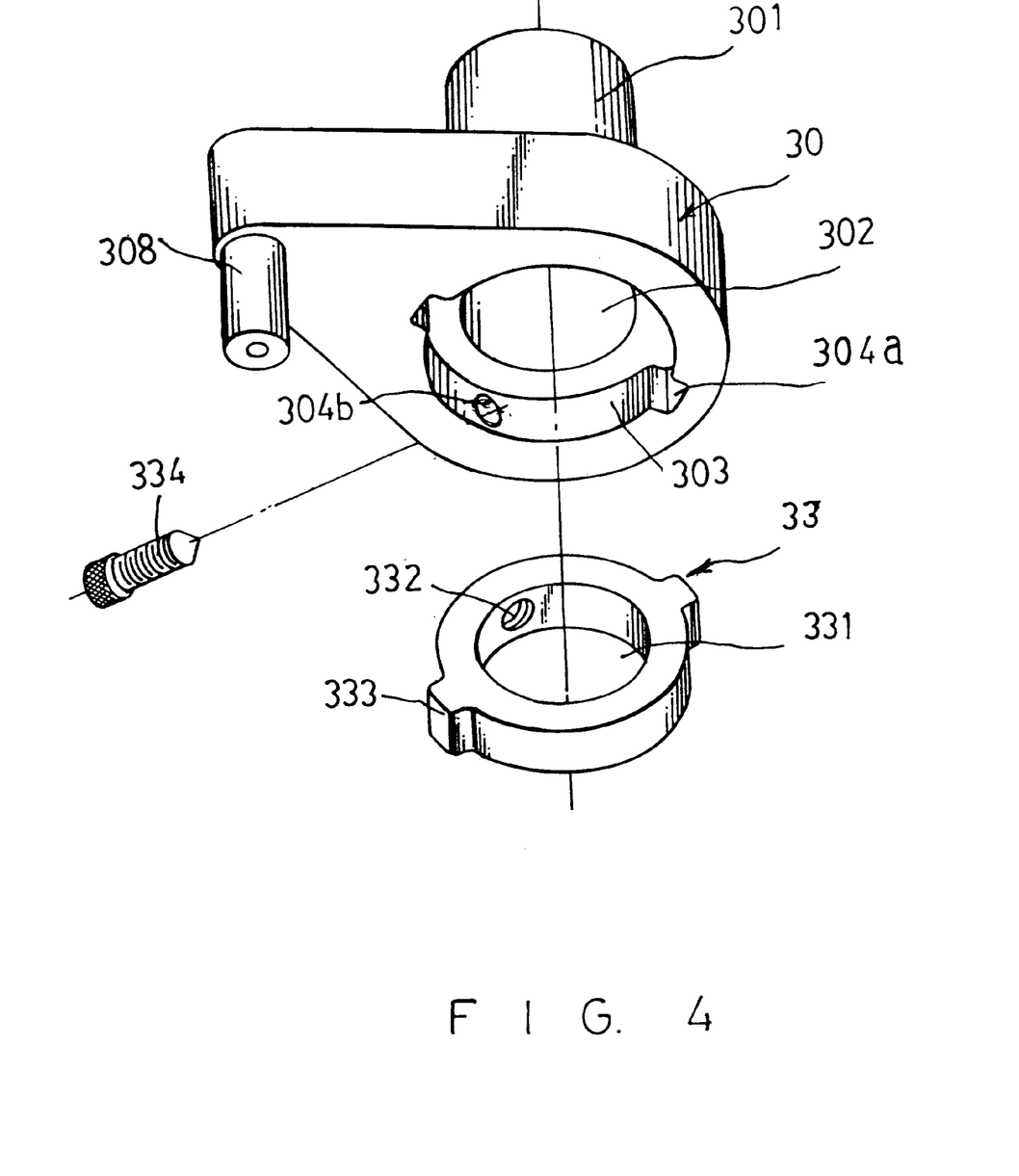
FIG. 4 is an exploded perspective view to show a coupling adapter engaging with a base seat.

With reference to the drawings and initiating from FIGS. 3 and 4, the heandlebar of the present invention comprises generally a base seat 30, a displacement device 40 and a rotatable handlebar 50.

The base seat 30 includes a circular housing having an enclosed wall 31 abutting a roughly triangular extension 32, a tubular projection 301 central extended upward from an inner surface including a central bore 302, a large diameter circular recess 303 abutting the lower end of the bore 302 including a pair of notches 304a in opposite inner periphery and a first screw hole 304b in a peripheral wall perpendicular to the notches 304a, a pair of first and second anchoring slits 306 and 307 abutting the opposite inner peripheries of the enclosed wall 31, an elongate slot 305 in the triangular extension 32 extended from the enclosed wall 31 to a protrudent thru hole 308 which is projected downward from the peak of the triangular extension 32, a catch rod 309 projected upward from an inner surface between the tubular projection 301 and the enclosed wall 31, and a coupling flange 310 extended inward from an upper inner periphery of the enclosed wall 31.

An adapter ring 33 includes an annular body 331 engageable into the circular recess 303, a second screw hole 332 in a periphery engageable with the first screw hole 304b and a pair of protrusions 333 projected outward from opposite outer peripheries engageable into the notches 304a. So that the adapter ring is engaged into the circular recess 303 to connected the base seat 30 to the headset of a bicycle and secured by a screw 334.

The displacement device 40 includes an arcuate plate 41 anchored into the first and second anchoring slits 306 and 307 of the base seat 30 and having a plurality of positioning slots 411 formed in an inner periphery, a tension ring 42 which has an annular body 421 rotatably sleeved onto the tubular projection 301 of the base seat 30, a retaining space 422 formed in an extension 423 at an outer periphery of the body 421 and an L-shaped slit 424 in an outer periphery perpendicular to the retaining space 422 for securing a spring plate 43 which has an L-shaped end 432 engageable into the slit 424 and an arcuate end 431 displaceably engageable with the positioning slots 411 of the arcuate plate 41.

Figure 5:
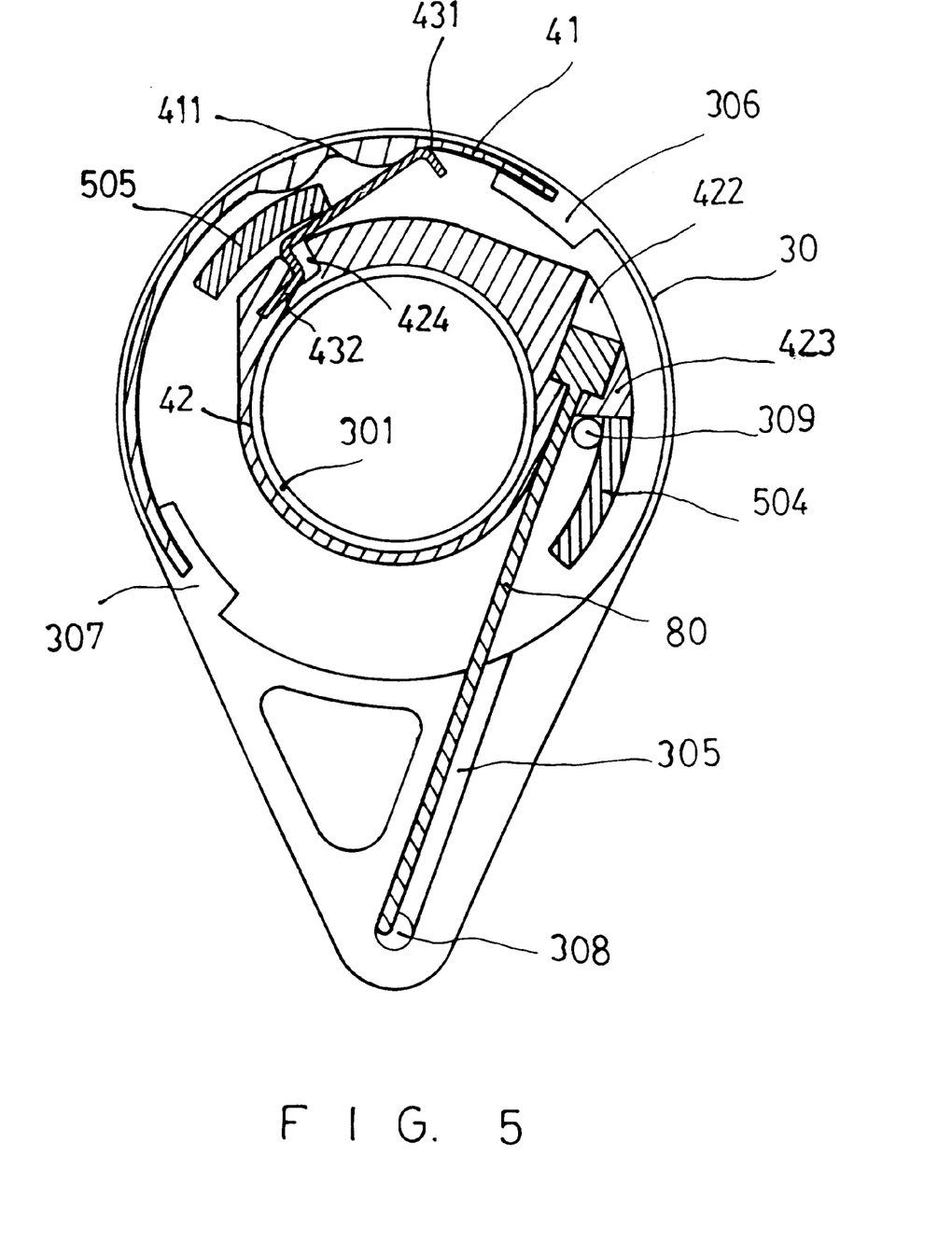
FIG. 5 is a sectional view to show an assemblage of the twist handlebar of the present invention.
Figure 9:
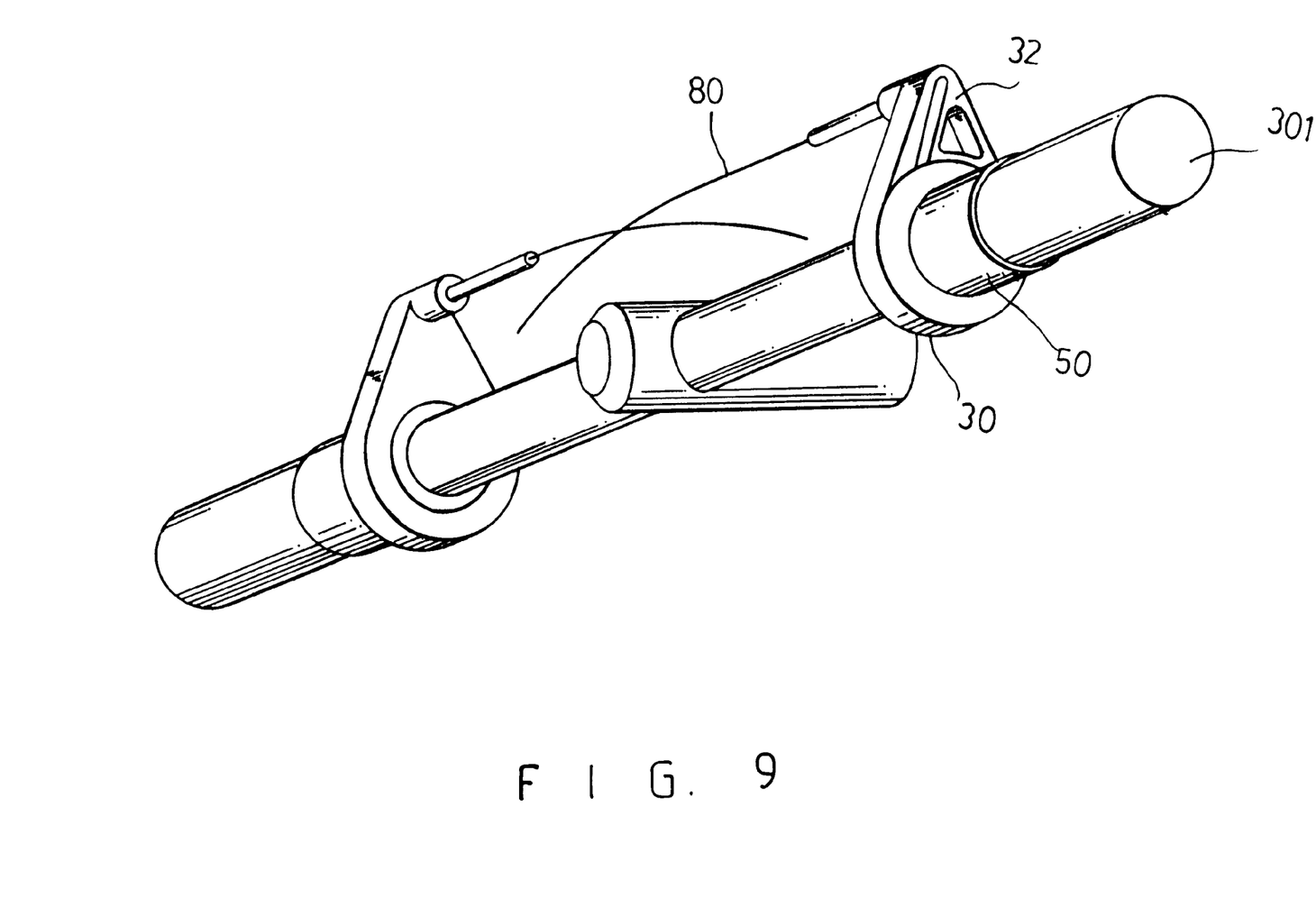
FIG. 9 is a perspective view to show the handlebar of the present invention mounting to the headset of a bicycle.

The rotatable handlebar 50 includes a cylinder body abutting an inverse taperd portion 502 at lower end, a central bore 503 rotatably engaged onto the tubular projection 301 of the base seat 30, a first and second actuator plates 504 and 505 symmetrical projected downward from the bottom of the inverse tapered portion 502 and an annular coupling groove 506 formed around an outer periphery adjacent the lower end of the inverse tapered portion 502 which is rotatably engaged with the coupling flange 310 of the base seat 30. After the engagement of the rotatable handlebar 50 with the base seat 30, the first actuator plate 504 should be engaged with the extension 423 of the tension ring 42 and the second actuator plate 505 should be engaged with the spring plate 43. In addition, the catch rod 309 of the base seat 30 also engages with the extension 423 when it is at normal position. The catch rod 309 is provided to prevent the extension 423 of the tension ring 42 from further clockwise movement. A cable 80 has a large diameter head engages into the retaining space 422 of the tension ring 42 and another end extends out of the base seat 30 via the elongate slot 305 and the protrudent thru hole 308 and then connects to the derailleur (not shown) of a bicycle in a predetermined tension. FIG. 5 shows an assemblage of the twist handlebar of the present invention and FIG. 9 shows that the twist handlebar of the present invention mounting to the headset of a bicycle.

Figure 6:
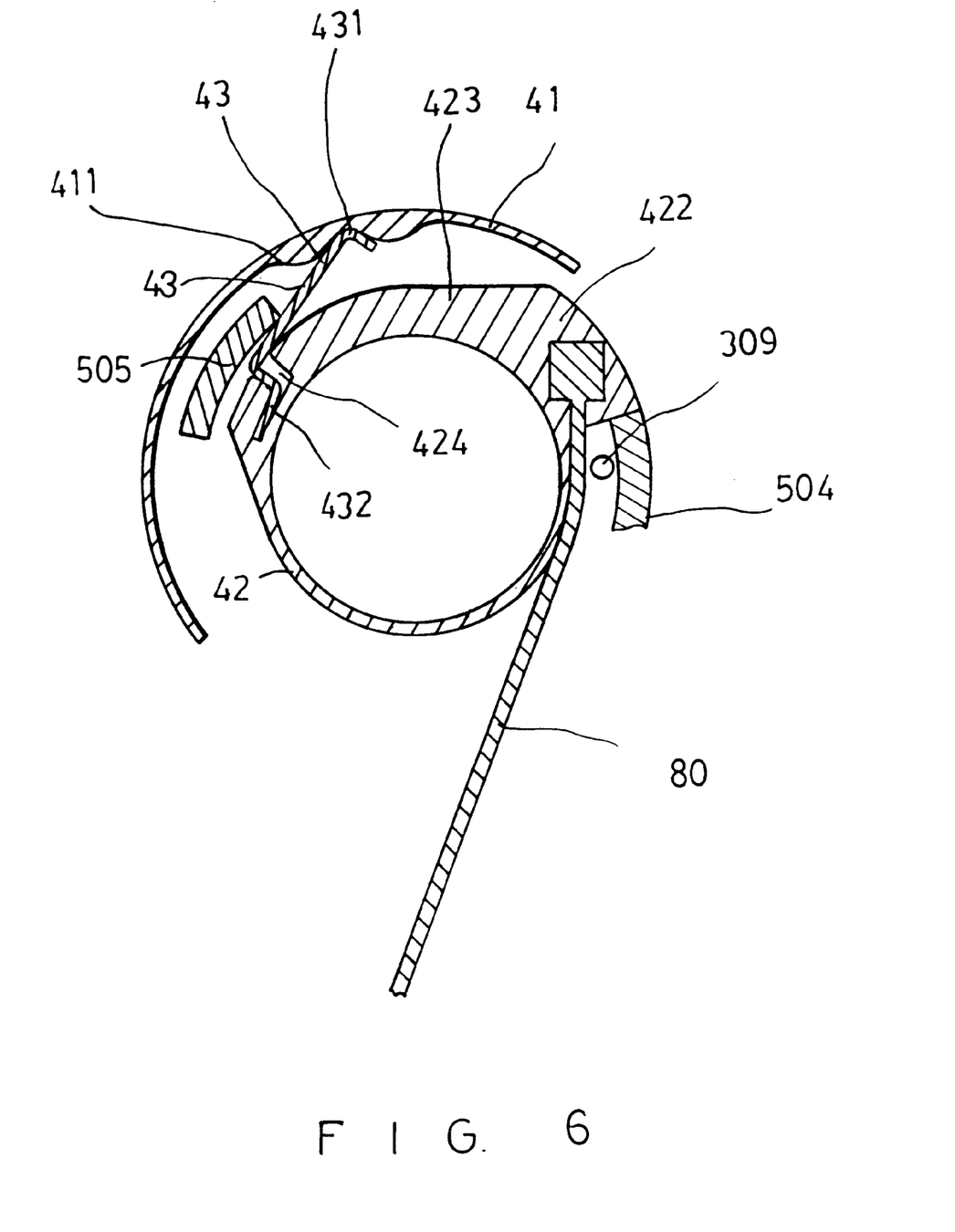
FIGS. 6 and 7 are the sectional views indicating the operational mode of the present invention.
Figure 7:
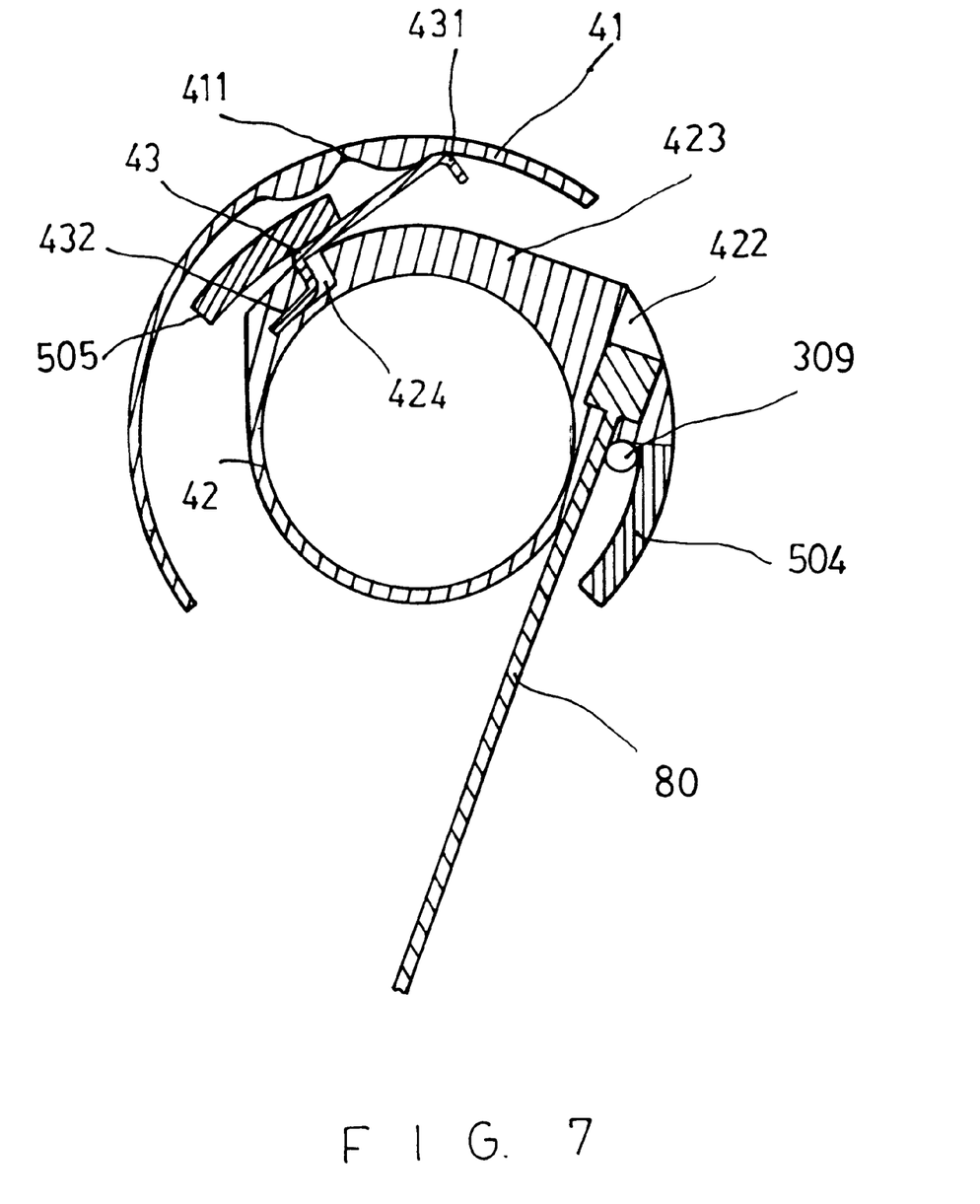

Referring to FIGS. 6 and 7 illustrating the operational mode of the twist handlebar of the present invention. When rotates the handlebar 50 counterclockwise, the tension ring 42 pushed by the first actuator plate 504 also rotates counterclockwise so that the spring plate 43 moves in concert with tension ring 42 and its arcuate end 431 is forced to frictionally shift to next positioning slot 411 on its own elasticity. Where, the cable 80 is dragged to move forward a predetermined segment to obtain the adjustment of speed for the derailleur. This time, the tension between the tension ring 42 and the derailleur becomes greater that effects the stability of the spring plate 43. However, the spring plate 43 becomes more stable because of its L-shaped end 432 embedded in the L-shaped slit 424 and the angle defined between the spring plate 43 and the tension ring 42 trends to become larger (as shown in FIG. 6). When rotates the handlebar 50 clockwise, the spring plate 43 pressed by the second actuator plate 505 becomes deformed prior to shift to the original positioning slot 411, in cooperation with the tension force of the cable 80, its arcuate end 431 will be readily shifted the original positioning slot 411 without friction (as shown in FIG. 7). This feature provides the displacement device 40 of the present invention more durable than any prior art. Further, the catch rod 309 is provide to prevent provide the displacement device 40 more stable.

Figure 8:
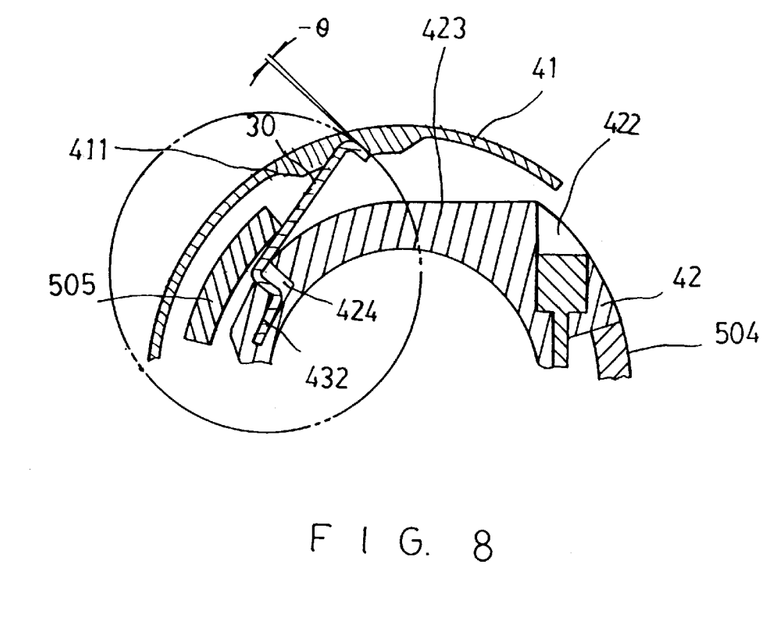
FIG. 8 is a sectional view illustrating the tangent angle of the actuate end of the spring plate.

FIG. 8 indicates that a negative angle (−θ) is defined between the tangent lines of the outer surface of the arcuate end 431 of the spring plate 43 and the inner surface of the positioning slot 411. This provides that the curve of outer surface of the arcuate end 431 and the inner surface of the positioning slot 411 can tolerate greater allowable error than the prior art but not sacrifices the stability and the operational or functional accuracy. Besides, the cable 80 of the present invention is directly connected to the tension ring 42 that provides more dexterous operation than that of the prior art in which the cable 80 is mostly connected to the handlebar.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A twist handlebar for rotatably controlling a derailleur of a bicycle, comprising;

a base seat comprising a circular housing which has an enclosed wall abutting a triangular extension, a tubular projection centrally projecting upward from an inner surface thereof and having a central bore coaxially extended therethrough, first and second anchoring members symmetrically protruded from two opposite inner peripheral sides of said enclosed wall respectively, said triangular extension extended from said enclosed wall to a protrudent thru hole which is projected downwardly from a peak of said triangular extension, an elongate slot extending from said enclosed wall to said peak of said triangular extension, a circular recess which has a diameter larger than that of said central bore being coaxially extended from a lower end of said central bore to a bottom side of said base seat, a pair of notches respectively indented at two inner opposite sides of a peripheral wall of said circular recess, a first screw hole which is formed on said peripheral wall of said circular recess being perpendicular to said notches, and a coupling flange formed around an inner periphery edge of an upper rim of said enclosed wall;

an adapter ring comprising an annular body adapted to engage into said circular recess of said base seat, a pair of protrusions projected outwardly from two opposite outer sides of said annular body for engaging with said pair of notches of said circular recess of said base seat respectively, and a second screw hole which is formed on said annular body and perpendicular with said protrusions, wherein said second screw hole is coaxially aligned with said first screw hole when said adapter ring is engaged into said circular recess for enabling a screw to securely connect said base seat with said adapter ring by screwing through said first and second screw holes;

a displacing device, which comprises:

a tension ring, which is rotatably sleeved onto said tubular projection of said base seat, having a L-shaped slit provided in an outer peripheral wall thereof, an extension extended outwardly from said outer peripheral wall, and a retaining space formed inside said extension, a spring plate having an arcuate end and a L-shaped end engaged into said L-shaped slit of said tension ring, a cable having an enlarged first end secured to said retaining space of said tension ring and a second end extended to out of said base seat through said elongate slot and said protrudent thru hole for connecting with said derailleur of said bicycle, and an arcuate plate anchored in said first and second anchoring members of said ase seat having a plurality of positioning slots adapted for displaceably engaging with said arcuate end of said spring plate; and a handlebar comprising a cylinder body having an inverse tapered portion at a lower end thereof, a bore axially extended thereof for rotatably engaging onto said tubular projection of said base seat, first and second actuator members symmetrically and downwardly projected from a bottom of said inverse tapered portion, and an annular coupling groove formed around an outer periphery edge of a lower end of said inverse tapered portion so as to rotatably engage with said coupling flange of said base seat, wherein said handlebar is rotatably engaged with said base seat by engaging said coupling flange with said annular groove, whereby rotation of said handlebar selectively shifts said arcuate end of said spring plate with said positioning slots of said arcuate plate.

2. The twist handlebar as recited in claim 1 wherein said second actuator member abuts said spring plate.

3. The twist handlebar as recited in claim 1 wherein a catch member is arranged to prevent said tension ring from further clockwise rotation.

4. The twist handlebar as recited in claim 1 wherein said first actuator member abuts said extension of said tension ring.

5. The twist handlebar as recited in claim 4 wherein said second actuator member abuts said spring plate.

\* \* \* \* \*